United States Patent [19] [11] 4,214,795

Kakuminato [45] Jul. 29, 1980

[54] PISTON BRAKING DEVICE FOR HYDRAULIC OR PNEUMATIC CYLINDERS

[75] Inventor: Tetsuo Kakuminato, Koshigaya, Japan

[73] Assignee: Shoketsu Kinzoku Kogyo Kabushiki Kaisha, Tokyo, Japan

[21] Appl. No.: 961,923

[22] Filed: Nov. 20, 1978

[30] Foreign Application Priority Data

Nov. 25, 1977 [JP] Japan .............................. 52-158660

[51] Int. Cl.[2] .............................................. B60T 17/16

[52] U.S. Cl. .......................................... 303/89; 91/41; 92/25; 188/265

[58] Field of Search .................. 91/41, 44, 45; 92/20, 92/23-28; 188/67, 265; 303/89

[56] References Cited

U.S. PATENT DOCUMENTS 2,759,569 8/1956 Keehn ............................. 188/265 X 4,015,698 4/1977 Sousamian et al. ................. 188/265

*Primary Examiner*—Duane A. Reger

*Attorney, Agent, or Firm*—Haight, Rosfeld, Noble & Santa Maria

[57] ABSTRACT

A piston braking device for a hydraulic or pneumatic cylinder, employing an annular braking plate loosely fitted on the piston rod of the cylinder and rockable into a tilted position relative to the piston rod upon actuation by a plate drive means, and a brake control mechanism operative to apply a counter pressure on the braking plate to maintain or reset the braking plate in a normal right angle position, the braking plate having braking portions on its inner periphery which braking portions are pressed against the circumference of the piston rod to apply friction brakes thereto in a manner which increases the braking force in proportion to the propelling force of the piston rod.

5 Claims, 4 Drawing Figures

PISTON BRAKING DEVICE FOR HYDRAULIC OR PNEUMATIC CYLINDERS

BACKGROUND OF THE INVENTION

This invention relates to a brake for linear actuators such as hydraulic or pneumatic cylinders, and more particularly to a braking device which is adapted to apply a friction brake to a piston rod of a hydraulic or pneumatic cylinder through a tiltable braking plate which is associated with the piston rod of the cylinder.

In order to brake a hydraulic or pneumatic cylinder in the middle of the piston stroke, it is possible to apply brakes hydrodynamically with use of directional valves which control the braking fluids. However, hydrodynamic brakes have inherent problems such as braking failure due to leakage of the braking fluid or unreliability of operation particularly where a compressive fluid like air is used as the braking fluid.

The present invention has as its object the provision of a braking device for a hydraulic or pneumatic cylinder, employing a braking disc which is rockable into a tilted position relative to the piston rod of the cylinder to apply thereto a braking force increasing in proportion to the propelling force of the piston rod.

It is another object of the present invention to provide a braking device of the class mentioned above, which is simple and compact in construction and reliable in operation and which can be readily assembled on the conventional hydraulic or pneumatic cylinders without changing the cylinder constructions or their designs.

It is still another object of the present invention to provide a braking device of the class mentioned above, which is constituted by a very small number of component parts which do not require precision work.

SUMMARY OF THE INVENTION

According to the present invention, there is provided a braking device for stopping a piston rod of a hydraulic or pneumatic cylinder at a desired position in the course of its stroke, the braking device comprising: a cylindrical casing to be joined to one end of the cylinder and having an aperture in the outer end wall thereof for slidably receiving the piston rod of the cylinder; an annular braking plate and a resetting piston loosely fitted side-by-side on the piston rod within the casing and axially supported on a fulcrum member for rocking movement thereabout; a plate driving means mounted within the casing and acting at a position radially opposite to the fulcrum member to rock the braking plate about the fulcrum member into a braking position tilted relative to the axis of the piston rod; the braking plate having braking portions on the inner periphery thereof, which braking portions are brought into frictional contact with the circumference of the piston of the cylinder moving in one particular direction when the braking plate is tilted by the driving means thereby to apply to the piston rod a braking force increasing in proportion to the propelling force thereof; the resetting piston having a pressure receiving surface on the side away from the braking plate; and a brake control mechanism operable to apply a pressure to the pressure receiving surface to push the resetting piston against the braking plate to maintain or reset the braking plate in normal position perpendicular to the axis of the piston rod.

In one preferred form of the invention, the driving means consists of a coil spring and the brake control mechanism is adapted to control the supply of a resetting fluid pressure to a chamber which is defined between the pressure receiving surface of the resetting piston and the other end wall of the casing.

In another preferred form of the invention, the braking plate and the resetting piston are integrated into a braking disc of one single structure which can perform the functions of these two components. In still another form of the invention, a pair of similar braking discs are mounted symmetrically within the casing to constitute a dual braking system which can effectively apply brakes on the piston rod which is moving in either direction.

The above and other objects, features and advantages of the invention will become apparent from the following description of preferred embodiments and the appended claims, taken in conjunction with the accompanying drawings which form part of this specification.

BRIEF DESCRIPTION OF THE DRAWINGS:

In the accompanying drawings:

FIG. 4 is a diagrammatic sectional view of the braking device of another modification which employs a pair of similar braking discs mounted symmetrically to provide a dual braking system.

Figure 1:
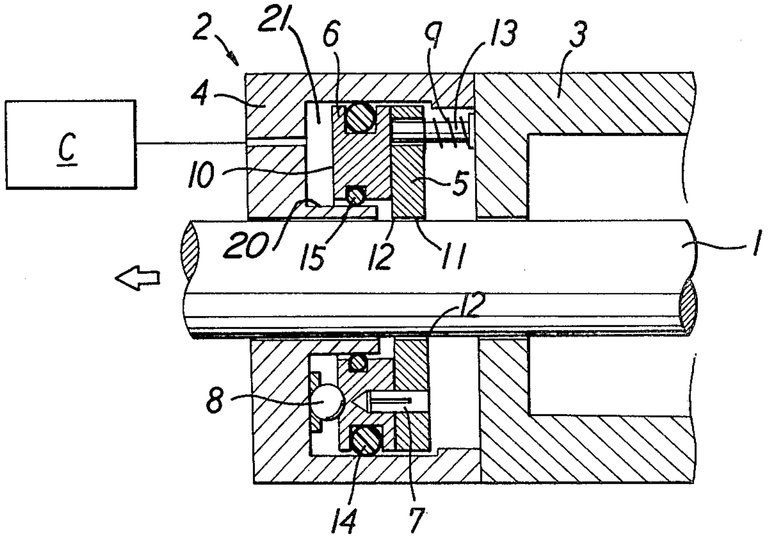
FIG. 1 is a diagrammatic sectional view of a braking device according to the present invention.
Figure 2:
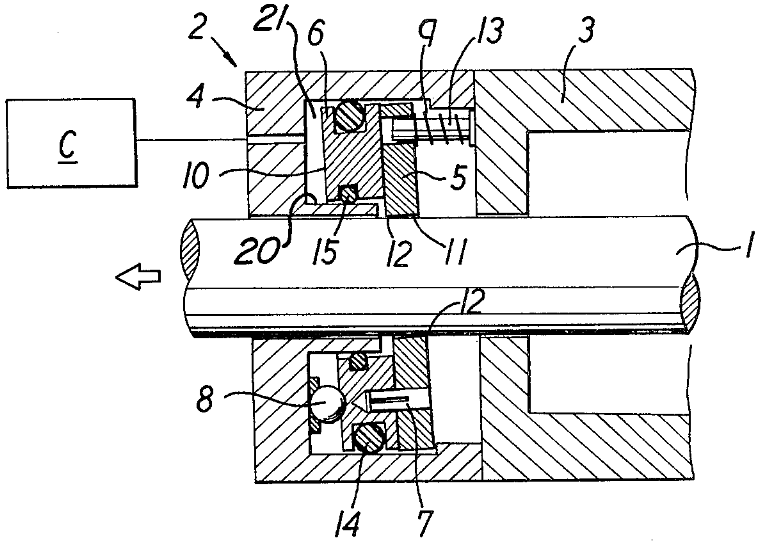
FIG. 2 is a view similar to FIG. 1 but showing the braking plate and the associated component parts in the tilted braking position.

DESCRIPTION OF PREFERRED EMBODIMENTS:

Referring to the accompanying drawings and first to FIGS. 1 and 2, the reference numeral 1 designates a piston rod of a hydraulic or pneumatic cylinder 3 which is provided with a piston braking device 2 according to the present invention. The piston braking device 2 generally consists of a cylindrical casing 4 which is mounted at the rod end of the cylinder 3 and has a sleeve 20 extending inwardly along the piston rod 1, an annular braking plate 5 which is loosely fitted on the piston rod 1 within the casing 4, and a resetting or brake releasing piston 6 hermetically fitted between the inner periphery of the casing 4 and the outer surface of the sleeve 20 in side-by-side relation with the braking plate 5. The braking plate 5 and the brake releasing piston 6 are interconnected by a split pin 7 which is anchored in the braking plate 5 and the brake releasing piston 6 at a position close to the outer peripheries thereof. The assembly of the braking plate 5 and the brake releasing piston 6 is axially supported by a steel ball 8 which is fixedly mounted between the outer end wall of the casing 4 and the piston 6. A spring 9 which constitutes the plate drive means is mounted between the braking plate 5 and the cylinder 3 at a position radially opposite to the ball 8, urging the braking plate 5 to rock on the steel ball 8 into a tilted or oblique position relative to the piston rod 1. The sleeve 20 and the resetting piston 6 define a fluid chamber 21 in the casing 4 to form a pressure receiving surface 10 on the piston 6 for receiving a resetting fluid pressure which is supplied from a brake control mechanism C as diagrammatically indicated in FIGS. 1 and 2. The fluid pressure supplied from the brake control mechanism C which, for example, consists of an electromagnetic valve, acts on the pressure receiving surface 10, pushing the piston 6 and braking plate 5 against the action of the spring 9 into the respective rectified or right angle positions. Instead of using a fluid pressure, the rectification of the piston 6 and braking plate 5 may be performed by a mechanical means as will be described hereinlater.

The braking plate 5 is provided with braking edge portions 12 at the marginal edge portions of its inner periphery which are frictionally pressed against the circumference of the piston rod 1 when the braking plate 9 is tilted by the spring 5 to apply brakes on the piston rod 1.

In FIGS. 1 and 2, the reference numeral 13 indicates a guide pin for the spring 9 and the reference numerals 14 and 15 denotes O-rings which are fitted in the brake releasing piston 6 for hermetical sliding engagement with the inner wall surface of the casing 4 and the central sleeve 20 for reducing the frictional wear of the sealing member 15 which would be rapidly worn out when the piston 6 contacts with the reciporcating piston rod 1, thus ensuring stable operation of the braking device. In the embodiment of FIGS. 1 and 2, the braking plate 5 is maintained in the normal or right angle position relative to the piston rod 1 as shown in FIG. 1 as long as the resetting fluid pressure is supplied to the pressure receiving surface 10 in the fluid chamber 21 from the control mechanism C, the braking edge portions 12 allowing free reciprocating movement of the piston rod 1 without being pressed thereagainst.

Upon cutting off the resetting or rectifying fluid pressure supply to the pressure receiving surface 10, the braking plate 5 is tilted by the force of the spring 9, as shown in FIG. 2, with the braking edge portions 12 pressed against the circumference of the piston rod 1 to stop the piston of the hydraulic or pneumatic cylinder 3 by the force of friction which occurs between the braking portions 11 and the piston rod 1. This braking force is applied more effectively on a piston rod 1 which is moving in the tilting direction of the braking plate 5 or in the direction indicated by an arrow in FIG. 1. In this instance, once the braking plate 5 is tilted relative to the piston rod 1 by the force of the spring 9, the frictional force which occurs between the braking portions 12 and the piston rod 1 acts to tilt the braking edge plate 5 all the more thereby increasing the braking force as well. This means that the braking force is increased according to the propelling force of the cylinder 3. Therefore, the spring 9 suffices to have a relatively small driving force which can cause the initial friction between the braking edge portions 12 and the piston rod 1.

When the piston rod 1 is moving in the direction opposite to the arrow of FIG. 1, the frictional force between the rod 1 and the braking portions 12 acts to block the tilting of the braking plate 5 and therefore no braking force is produced even if the control mechanism C is operated to cut off the supply of the rectifying fluid pressure.

In FIG. 4, a pair of braking discs 17 are mounted on the piston rod 1 within the casing, in face-to-face or symmetrical relation and at a space from each other. The braking discs 17 are tiltably supported on a roller 18 which is snugly nested in the countershaped recesses in the lower portions of the opposing walls of the braking discs 17. The braking discs 17 are tilted in the opposite directions or toward each other by the action of the respective biasing springs **9*b* as soon as the control mechanism C is operated to cut off the rectifying fluid pressure supply to the fluid chamber 21. Therefore, in this instance, the braking forece is applied by the braking portions 12*b* of either one of the braking discs 17 irrespective of the direction of movement of the piston rod 1**.

Figure 3:
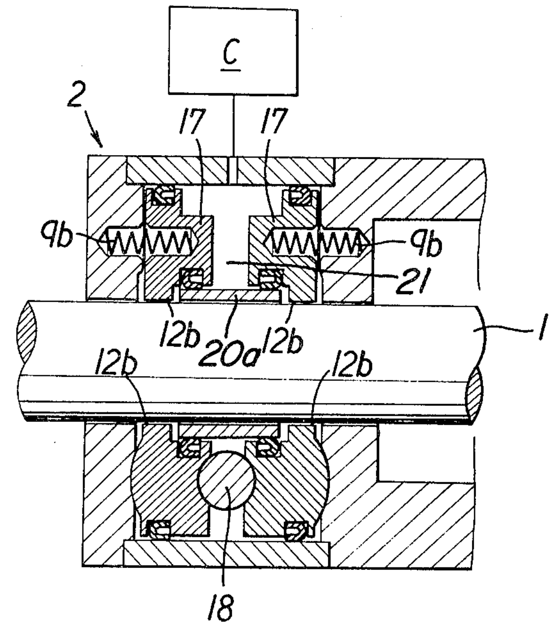
FIG. 3 is a diagrammatic sectional view of the braking device of a modification which employs a braking disc which integrates the braking plate and the resetting piston into one and single structure.

In the foregoing embodiments, the brake control mechanism C has been shown as controlling the supply of the rectifying fluid pressure to the pressure receiving surface of the braking plate or disc. However, in the embodiments of FIGS. 1 and 3, the brake control mechanism C may employ a small-sized piston cylinder with a push rod thereby to mechanically apply a pressure on the braking plate or disc for maintaining or resetting the braking disc in the normal right angle position. The brake control mechanism C, whether adapted to apply the resetting pressure on the piston through a hydraulic circuit or through a mechanical linkage, can be constructed by the use of conventional means to perform the operations described hereinbefore.

In addition, instead of springs 9, **9*a* and 9*b***, the plate driving means may be constituted by a small piston cylinder or other actuator which is located within the casing to urge the braking plate into the tilted position.

What is claimed is:

1. A braking device for a hydraulic or pneumatic cylinder comprising:

a cylindrical casing to be joined to one end of said cylinder and having an aperture in the outer end wall thereof for receiving a piston rod of said cylinder;

a sleeve fitted on said piston rod within said casing;

an annular braking plate loosely fitted on said piston rod within said casing;

a resetting piston hermetically fitted between the inner periphery of said casing and the outer surface of said sleeve in side-by-side relation with said braking plate and axially supported on a fulcrum member for rocking movement thereabout together with said braking plate;

a fluid chamber defined in said casing by said sleeve and resetting piston and connected to a pressure source;

a plate driving means mounted at a position radially opposite to said fulcrum member and acting to rock said braking plate about said fulcrum member together with said piston into a braking position tilted relative to the axis of said piston rod;

said braking plate having braking portions on the inner periphery thereof, said braking portions being brought into frictional contact with the circumference of said piston rod moving in one particular direction when said braking plate is tilted by said driving means thereby to apply to said piston rod a braking force increasing in proportion to the propelling force thereof;

said resetting piston having a pressure receiving surface within said fluid chamber; and a brake control mechanism capable of applying pressure to said fluid chamber to push said resetting piston against said braking plate to maintain or reset said braking plate in normal position perpendicular to the axis of said piston rod.

2. A braking device as set forth in claim 1, wherein said braking plate and resetting piston are integrated into a braking disc of unitary structure.

3. A braking device as set forth in claims 1 and 2, wherein said braking disc is provided with O-rings on the inner and outer peripheries to provide a hermetically sealed chamber between said pressure receiving surface and said outer end wall of said casing, and said brake control mechanism is capable of controlling the supply of pressurized fluid to said pressure receiving surface.

4. A braking device as set forth in claim 2, further comprising a second braking disc which is loosely mounted on said piston rod within said casing symmetrically to and at a distance from the first braking disc, said first and second braking discs being tiltable in opposite directions to apply a braking force securely on said piston rod moving in either direction.

5. A braking device as set forth in claim 2, wherein the inner periphery of said braking disc is cut obliquely in a direction inverse to the tilting direction thereof to provide tolerance for frictional wear of said braking portions.

* * * * *